Figure 1:
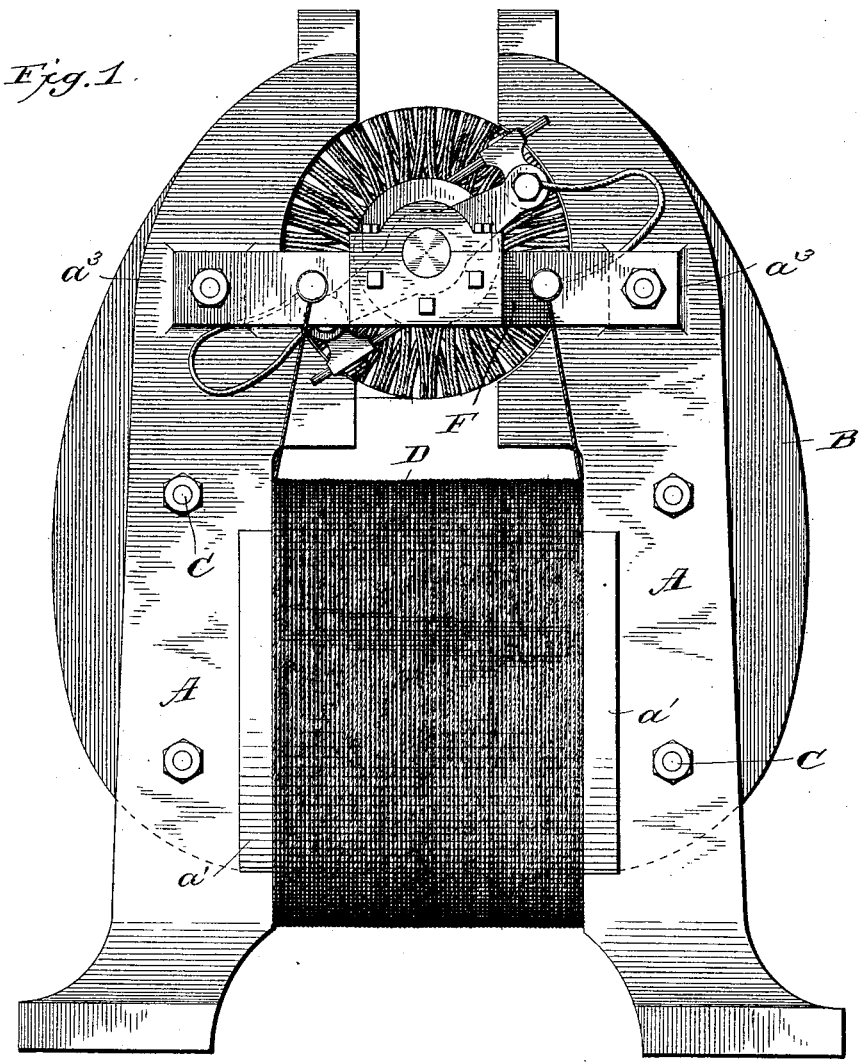

(No Model.) 3 Sheets—Sheet 1.
W. K. FREEMAN.
ELECTRIC MOTOR OR GENERATOR.

No. 452,934. Patented May 26, 1891.

WITNESSES: INVENTOR
Walter K. Freeman,
BY
HIS ATTORNEYS

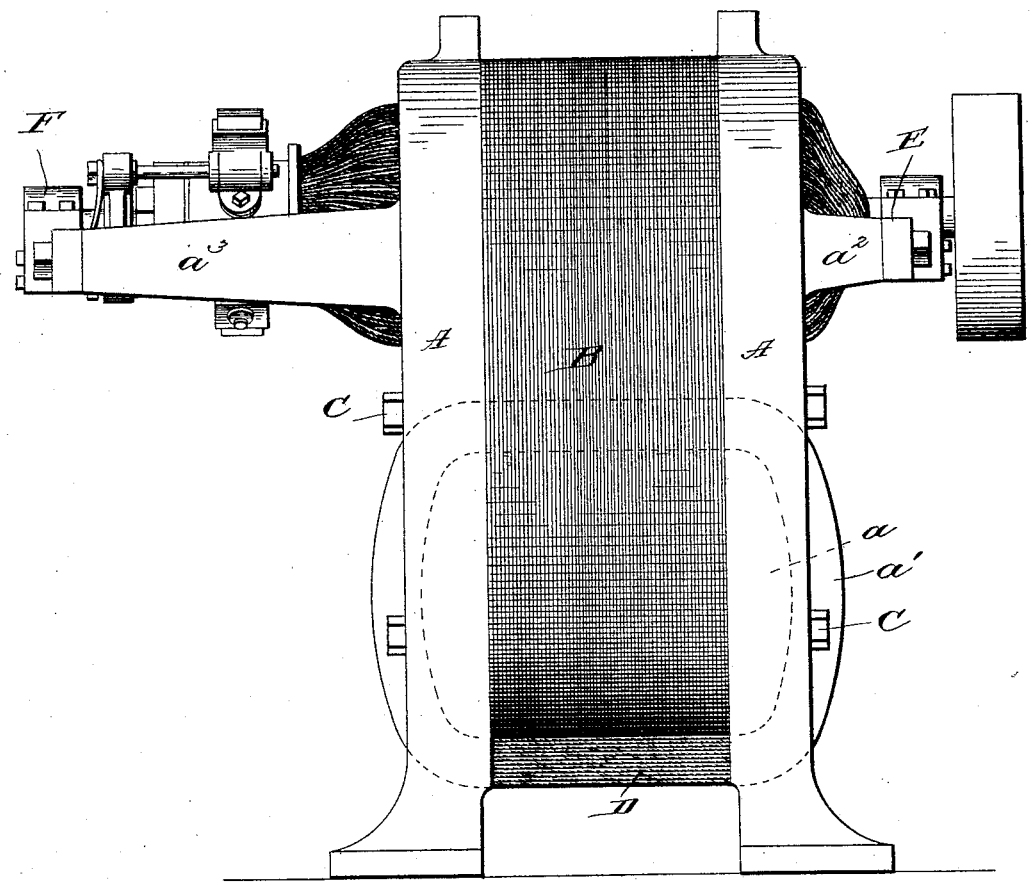

(No Model.) 3 Sheets—Sheet 3.
W. K. FREEMAN.
ELECTRIC MOTOR OR GENERATOR.
No. 452,934. Patented May 26, 1891.
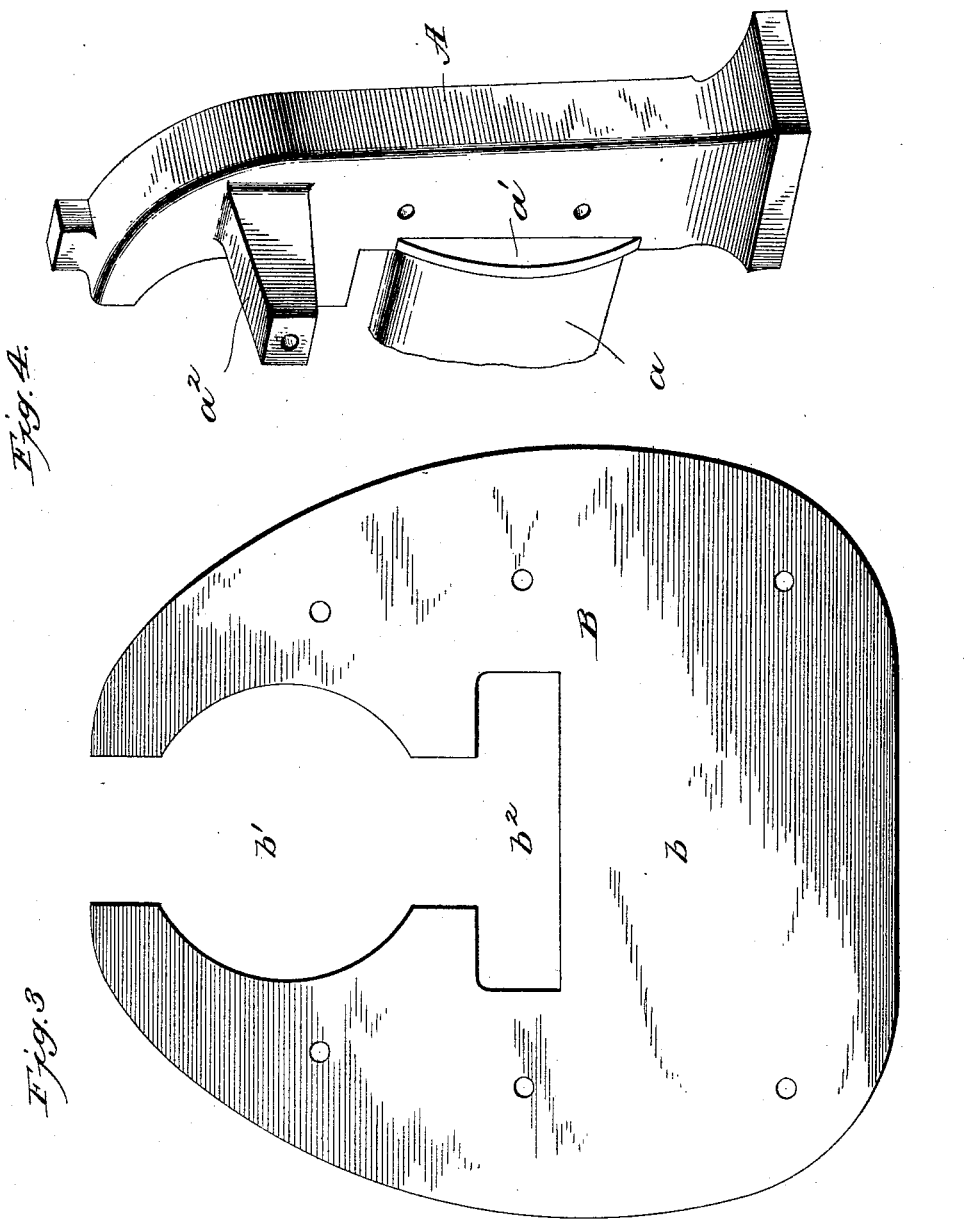

UNITED STATES PATENT OFFICE.

WALTER K. FREEMAN, OF BROOKLYN, NEW YORK, ASSIGNOR TO WILLIAM S. HADAWAY, JR., TRUSTEE, OF BOSTON, MASSACHUSETTS.

ELECTRIC MOTOR OR GENERATOR.

SPECIFICATION forming part of Letters Patent No. 452,934, dated May 26, 1891.

Application filed January 13, 1891. Serial No. 377,664. (No model.)

*To all whom it may concern:*

Be it known that I, WALTER K. FREEMAN, of Brooklyn, in the county of Kings and State of New York, have invented certain new and useful Improvements in Electric Motors; and I do hereby declare the following to be a full, clear, and exact description of the same, reference being had to the accompanying drawings, forming a part of this specification, and to the figures and letters of reference marked thereon.

My invention has for its object to improve the construction of electric motors with a view to increasing their efficiency and at the same time cheapening their cost of manufacture.

In the accompanying drawings, Figure 1 represents a side elevation of a motor constructed in accordance with my invention. Fig. 2 is an end elevation of the same. Fig. 3 is a view of one of the plates or laminæ which enter into the construction of the field-magnet. Fig. 4 is a view of a portion of the frame-work, which also constitutes part of the field-magnet.

Similar letters of reference in the several figures indicate the same parts.

The field-magnet is composed of two main castings A A and a series of thin soft-iron plates B, that are adapted to be clamped and held between said castings by means of suitable bolts and nuts C, or their equivalents, as shown in Figs. 1 and 2. Each of the castings A has its lower connecting portion $a$ formed substantially straight on its inner surface and rounded or convexed on its outer surface, so that when the two castings and the laminæ or plates or clamped together the said portions $a$ of the castings and the portions $b$ of the plates or laminæ (see Fig. 3) will form a core or body upon which the field-coil D may be wound on the outside at each end of the connecting-piece $a$, as shown in Figs. 1 and 2. In order that the coil may be held properly in place, the castings A are provided with the flanges $a'$, as shown in Fig. 4.

In Fig. 3 the form of one of the plates or laminæ of which the field-magnet is in part composed is shown, $b'$ indicating the substantially-cylindrical recess or opening to admit the armature, and $b^2$ the rectangular recess or opening to accommodate the coil D. These openings or recesses open out at the top of the lamina to facilitate winding and create the proper magnetic field.

Upon one of the castings A are formed arms $a^3$, which serve to support the bracket E, that carries the boxes or bearings of one end of the armature-shaft, while upon the other casting A are formed similar, though slightly longer, arms $a^3$, that support the bracket F, which carries both the bearing for the opposite end of the armature-shaft and the current-collecting devices.

The described structure is cheap, simple, and easily put together, and is found to be highly efficient.

Having thus described my invention, what I claim as new is—

1. In a motor-frame such as herein described, the combination of the end castings, each formed in one piece and having the sides A, connecting portion $a$, around which the field-coils are wound, and the flanges $a'$ at each end of said connecting-piece on the outside, substantially as described.

2. In a motor-frame such as herein described, the combination of the end castings, each formed in one piece and having the sides A, connecting portion $a$, around which the field-coils are wound, the flanges on the outside at each end of the connecting-piece, and the supporting-arms $a^2$ for the armature-shaft at the top of each side piece, substantially as described.

3. In the herein-described electric motor, the combination, with the end castings having the sides A, connecting portions $a$, around which the coils of the field-magnet pass, of the soft-iron laminæ having the recesses $b'$ $b^2$ for the reception of the armature and coils of the field-magnet, respectively, means for clamping the end pieces and laminæ together, and the field-magnet coil, substantially as described.

4. In the herein-described electric motor, the combination, with the end castings having the upwardly-extending portions forming pole-pieces, the connecting-pieces $a$ at the bottom and the flanges $a'$ at each end of said connecting portions, of the soft-iron laminæ B, having the recesses $b'$ $b^2$ opening out at
5 the top, the bolts and nuts C, connecting the end castings and laminæ, and the coil D, passing around the connecting-pieces $a$ and through the openings $b^2$, substantially as and for the purpose set forth.

WALTER K. FREEMAN.

Witnesses:
W. S. HADAWAY, Jr.,
CHAS. W. WOLCOTT.